(12) United States Patent
Wan et al.

(10) Patent No.: US 11,487,302 B2
(45) Date of Patent: Nov. 1, 2022

(54) UNMANNED AERIAL VEHICLE CONTROL METHOD AND APPARATUS, REMOTE CONTROL DEVICE, AND UNMANNED AERIAL VEHICLE SYSTEM

(71) Applicant: AUTEL ROBOTICS CO., LTD., Guangdong (CN)

(72) Inventors: Suqing Wan, Guangdong (CN); Xiaogang Lei, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 314 days.

(21) Appl. No.: 16/906,779

(22) Filed: Jun. 19, 2020

(65) Prior Publication Data
US 2020/0319657 A1  Oct. 8, 2020

Related U.S. Application Data

(63) Continuation of application No. PCT/CN2018/100289, filed on Aug. 13, 2018.

(30) Foreign Application Priority Data

Dec. 20, 2017  (CN) .......................... 201711387641.7

(51) Int. Cl.
*B64C 39/02* (2006.01)
*G05D 1/10* (2006.01)
(Continued)

(52) U.S. Cl.
CPC ........... *G05D 1/101* (2013.01); *B64C 39/024* (2013.01); *G05D 1/0016* (2013.01);
(Continued)

(58) Field of Classification Search
CPC .... G05D 1/101; G05D 1/0016; B64C 39/024; B64C 2201/027; B64C 2201/146; G10L 15/1822; G10L 15/22
See application file for complete search history.

(56) References Cited

U.S. PATENT DOCUMENTS

2017/0326726 A1  11/2017  Grotmol et al.

FOREIGN PATENT DOCUMENTS

CN  102233191 A  11/2011
CN  204945801 U  1/2016
(Continued)

OTHER PUBLICATIONS

The First Chinese Office Action dated Apr. 8, 2020; Appln. No. 201711387641.7.
(Continued)

*Primary Examiner* — Mathew Franklin Gordon (57) ABSTRACT

Embodiments of the present invention disclose an unmanned aerial vehicle (UAV) control method and apparatus, a remote control device, and a UAV system. The UAV control method is applied to a remote control device, the method including: obtaining voice information; determining target flight information of a UAV according to the voice information; obtaining a current flight parameter of the UAV, and generating a control instruction according to the current flight parameter and the target flight information; and sending the control instruction to the UAV, so that the UAV executes a corresponding flight mission according to the control instruction. Through the foregoing manner, according to the embodiments of the present invention, convenience and flexibility of operating a UAV can be improved by simplifying a control operation for the UAV, thereby improving user experience.

13 Claims, 3 Drawing Sheets

(51) Int. Cl.
*G05D 1/00* (2006.01)
*G10L 15/18* (2013.01)
*G10L 15/22* (2006.01)

(52) U.S. Cl.
CPC .......... *G10L 15/1822* (2013.01); *G10L 15/22* (2013.01); *B64C 2201/027* (2013.01); *B64C 2201/146* (2013.01)

(56) References Cited

FOREIGN PATENT DOCUMENTS

| CN | 105679322 A | 6/2016 |
| CN | 106682091 A | 5/2017 |
| CN | 108122553 A | 6/2018 |
| CN | 108375986 A | 8/2018 |

OTHER PUBLICATIONS

The International Search Report dated Nov. 13, 2018; PCT/CN2018/100289.

UNMANNED AERIAL VEHICLE CONTROL METHOD AND APPARATUS, REMOTE CONTROL DEVICE, AND UNMANNED AERIAL VEHICLE SYSTEM

This application is a continuation application of International Application No. PCT/CN2018/100289, filed on Aug. 13, 2018, which claims priority of Chinese Patent Application No. 201711387641.7, filed on Dec. 20, 2017, which is incorporated herein by reference in its entirely.

BACKGROUND

Technical Field

Embodiments of the present invention relate to the field of unmanned aerial vehicle (UAV) control, and in particular, to a UAV control method and apparatus, a remote control device, and a UAV system.

Related Art

In recent years, with the development of UAV technologies and decreasing costs, increasing consumer-grade UAVs have appeared on the market. In actual application, a UAV is easily affected by an environment and other disturbances in flight; consequently, difficulty of operation is increased for an operator. In addition, the operator also feels tired after holding and controlling a remote control device for a long time. Both the foregoing two cases lead to poor user experience.

SUMMARY

Embodiments of the present invention provide a UAV control method and apparatus, a remote control device, and a UAV system, to improve convenience and flexibility of operating a UAV by simplifying a control operation for the UAV, thereby improving user experience.

The technical solutions adopted in the embodiments of the present invention are as follows: According to a first aspect, a UAV control method is provided, applied to a remote control device, the method including:

obtaining voice information;

determining target flight information of a UAV according to the voice information;

obtaining a current flight parameter of the UAV, and generating a control instruction according to the current flight parameter and the target flight information; and sending the control instruction to the UAV, so that the UAV executes a corresponding flight mission according to the control instruction.

Optionally, after the obtaining voice information, the method further includes:

determining whether the voice information is valid; and the determining target flight information of a UAV according to the voice information includes:

if the voice information is valid, determining the target flight information of the UAV according to the voice information.

Optionally, the determining whether the voice information is valid includes:

parsing feature information in the voice information;

determining whether the feature information matches preset feature information in a feature information database; and if the feature information matches the preset feature information, determining that the voice information is valid.

Optionally, the feature information includes action feature information and/or parameter feature information; and the determining target flight information of a UAV according to the voice information includes:

determining the target flight information of the UAV according to the action feature information and/or the parameter feature information in the feature information.

Optionally, the target flight information includes at least one piece of information of a target flight position, a target flight height, a target flight direction, a target flight distance, a target flight speed, target flight acceleration, and a target flight mode.

Optionally, the method further includes:

when detecting that a flight state of the UAV in flight is an abnormal state, switching a current mode to a voice control mode, where the abnormal state includes at least one of: a flight mode of the UAV being a posture mode, an electric quantity of the UAV being less than a preset electric quantity threshold, and the UAV stopping image transmission to the remote control device; and the obtaining voice information includes:

obtaining the voice information in the voice control mode.

According to a second aspect, an embodiment of the present invention provides a UAV control apparatus, applied to a remote control device, the apparatus including:

a voice information obtaining module, configured to obtain voice information;

a flight information determining module, configured to determine target flight information of a UAV according to the voice information;

a control instruction generation module, configured to obtain a current flight parameter of the UAV, and generate a control instruction according to the current flight parameter and the target flight information; and a control instruction sending module, configured to send the control instruction to the UAV, so that the UAV executes a corresponding flight mission according to the control instruction.

Optionally, the apparatus further includes:

a voice information judging module, configured to determine whether the voice information is valid; and the flight information determining module is specifically configured to:

if the voice information is valid, determine the target flight information of the UAV according to the voice information.

Optionally, the voice information judging module is specifically configured to:

parse feature information in the voice information;

determine whether the feature information matches preset feature information in a feature information database; and if the feature information matches the preset feature information, determine that the voice information is valid.

Optionally, the feature information includes action feature information and/or parameter feature information; and the flight information determining module is specifically configured to:

determine the target flight information of the UAV according to the action feature information and/or the parameter feature information in the feature information.

Optionally, the target flight information includes at least one piece of information of a target flight position, a target flight height, a target flight direction, a target flight distance, a target flight speed, target flight acceleration, and a target flight mode.

Optionally, the apparatus further includes:

a mode switching module, configured to: when detecting that a flight state of the UAV in flight is an abnormal state, switch a current mode to a voice control mode, where the abnormal state includes at least one of: a flight mode of the UAV being a posture mode, an electric quantity of the UAV being less than a preset electric quantity threshold, and the UAV stopping image transmission to the remote control device; and the voice information obtaining module is specifically configured to:

obtain the voice information in the voice control mode.

According to a third aspect, an embodiment of the present invention provides a remote control device, including:

at least one processor; and a memory connected to the at least one processor, where the memory stores a computer program, and the at least one processor is configured to invoke the computer program, to perform the foregoing method.

According to a fourth aspect, an embodiment of the present invention provides a non-volatile computer-readable storage medium, where the computer-readable storage medium stores a computer program, and the computer program is invoked by a remote control device, to perform the foregoing method.

According to a fifth aspect, an embodiment of the present invention provides a computer program product, where the computer program product includes a computer program stored in a non-volatile computer-readable storage medium, the computer program includes a program instruction, and the program instruction is invoked by a remote control device, to perform the foregoing method.

According to a sixth aspect, an embodiment of the present invention provides a UAV system, including a UAV body and a remote control device, where the remote control device is configured to perform the foregoing method.

Beneficial effects of the embodiments of the present invention are as follows: Different from the cases in the traditional technology, in the embodiments of the present invention, voice information is obtained; target flight information of a UAV is determined according to the voice information, and a control instruction is generated according to a current flight parameter and the target flight information of the UAV; and the UAV may execute a corresponding flight mission according to the control instruction, so that a control operation for the UAV is simplified, difficulty of operation is reduced for an operator, and convenience and flexibility of operating the UAV can be improved, thereby improving user experience.

DETAILED DESCRIPTION

The following describes the technical solutions in the embodiments of the present invention with reference to the accompanying drawings. Apparently, the described embodiments are some rather than all of the embodiments of the present invention. All other embodiments obtained by persons of ordinary skill in the art based on the embodiments of the present invention without creative efforts shall fall within the protection scope of the present invention. The term "and/or" used in this specification includes any and all combinations of one or more related items listed.

In addition, the technical features involved in different implementations of the present invention described below can be combined as long as they do not conflict with each other.

Figure 1:
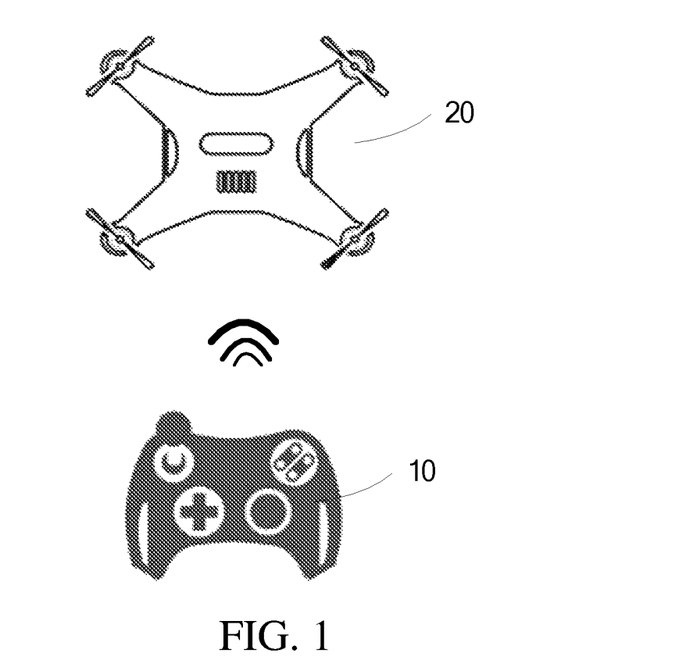
FIG. 1 is a schematic diagram of an implementation environment of various embodiments of the present invention.

FIG. 1 is a schematic diagram of an implementation environment of various embodiments of the present invention. As shown in FIG. 1, the implementation environment includes a remote control device 10 and a UAV 20.

A voice collection apparatus such as a microphone or a voice sensor may be configured in the remote control device 10. A communications interface may be further configured in the remote control device. The communications interface is configured to communicate with the UAV 20. The remote control device 10 may further include another apparatus. This is not limited herein. The remote control device may include a remote controller or any user terminal such as a smartphone, a tablet computer, or an image display device. Alternatively, the remote control device may include both a remote controller and another mobile device that can display an image. This is not limited herein.

A communications interface may be configured in the UAV 20. The communications interface can implement communication with the remote control device 10. The UAV may include an electronic speed regulator, a power system, a power supply system, so that the UAV can fly. Further, the UAV may further include various sensors or positioning apparatuses. The UAV may determine a current flight parameter according to the various sensors or positioning apparatuses configured in the UAV. Certainly, the UAV may further include another apparatus such as a photographic apparatus or a pan-tilt-zoom camera, to implement another flight mission. This is not limited herein.

The remote control device 10 and the UAV 20 can be in a communication connection, and they may be connected through a wireless technology or a wireless network. For a manner in which the remote controller 10 is connected to the UAV 20 is not limited herein.

Based on the foregoing environment, the following describes some method embodiments provided in the embodiments of the present application.

Figure 2:
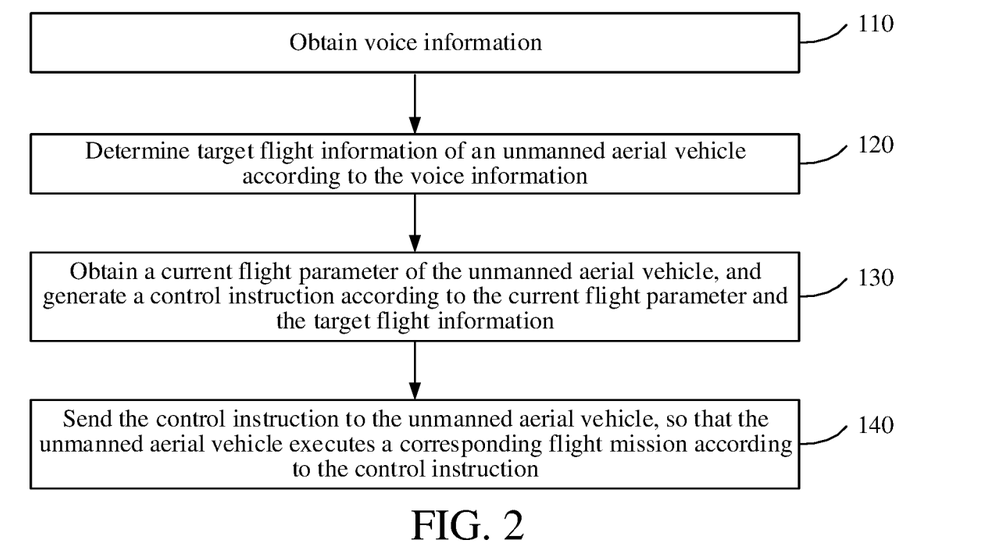
FIG. 2 is a schematic diagram of a UAV control method according to an embodiment of the present invention.

Referring to FIG. 2, FIG. 2 is a schematic diagram of a UAV control method according to an embodiment of the present invention. The method is applied to a remote control device, and specifically includes the following steps:

Step 110: Obtain voice information.

In specific implementation, voice information may be obtained by a voice collection apparatus. In an embodiment of the present invention, a sound collector may be a microphone, and in another embodiment, the voice collection apparatus may alternatively be another device that can receive a voice. The voice collection apparatus may be integrated in the remote control device, or may be separately disposed and then is electrically connected to the remote control device.

For example, when the remote control device includes both a remote controller and a smartphone that are in a communication connection, the voice collection apparatus may be separately disposed and then is connected to the remote controller and the smartphone, or may be directly integrated in the remote controller and/or the smartphone. Before a user issues a voice instruction, a current mode of the remote control device needs to be switched to a voice control mode in advance. For mode switching for the remote control device, switching may be directly performed by opening a corresponding application (APP) in the smartphone, or the remote controller may be directly operated, for example, a physical key is pressed, for switching. This is not strictly limited herein.

It may be understood that, in an actual operation process, a process of obtaining the voice information includes processing of the voice information, for example, denoising, to obtain clear voice information, and eliminate interference from environmental noise.

Step 120: Determine target flight information of a UAV according to the voice information.

Optionally, the target flight information includes at least one piece of information of a target flight position, a target flight height, a target flight direction, a target flight distance, a target flight speed, target flight acceleration, and a target flight mode.

For example, the user may issue a voice instruction such as "Flight direction: southeast; flight distance: 3 meters", and/or "Flight speed: 5 meters per second", and the remote control device may determine the target flight direction, the target flight distance, and/or the target flight speed of the UAV according to the obtained voice information.

Step 130: Obtain a current flight parameter of the UAV, and generate a control instruction according to the current flight parameter and the target flight information.

The current flight parameter of the UAV includes at least one parameter of a current position, an electric quantity/a fuel capacity, a height, a speed, a course, an attitude angle, an angle of attack, or a distance to an obstacle. Specifically, the UAV may obtain the foregoing flight parameters in real time in flight through various airborne sensors or positioning apparatuses.

For example, the remote control device may generate the control instruction with reference to the current flight parameter of the UAV.

An example is used for description. If the target flight information is the target flight position and the obtained current flight parameter of the UAV is a current flight direction, it may be first determined whether the UAV can be controlled to fly to the target flight position according to the current flight direction, and if not, the generated control instruction is adjustment of the current flight direction, so that the UAV can fly to the target flight position according to the adjusted flight direction.

If the target flight information is the target flight position and the obtained current flight parameter of the UAV is a current flight speed, the control instruction may be generated to control the UAV to fly to the target flight position according to the current flight speed.

Certainly, the foregoing implementation is merely an example. The remote control device may generate another control instruction with reference to the current flight parameter and the target flight information of the UAV. This is not limited herein.

Optionally, in actual application, the control instruction may also be generated with reference to an aerodynamic parameter of the UAV. Both maneuverability and stability of the UAV are related to aerodynamic characteristics of the UAV and control efficiency of a power system. Basic aerodynamic characteristics of the UAV mainly include a lift coefficient, a drag coefficient, a pitch moment coefficient, and a change relationship between a lift-drag ratio coefficient and an angle of attack of the UAV. Therefore, aerodynamic parameters mainly include the lift coefficient, the drag coefficient, the pitch moment coefficient, and the lift-drag ratio coefficient.

The aerodynamic parameter is a parameter inherent in the UAV, and may be prestored in the remote control device. A lift, a drag, a pitch moment, and efficiency of a lift power system of the UAV may be calculated according to the current flight parameter and the aerodynamic parameter of the UAV, and further, the control instruction is generated according to the current flight parameter, the target flight information, and the aerodynamic data.

In an embodiment, the control instruction may be directly generated by the remote controller, or may be generated by the APP in the smartphone, and then the APP in the smartphone transmits the control instruction to the remote controller. This is not strictly limited herein. Alternatively, it may be understood that, when the remote control device is directly a mobile device such as a smartphone, the generated control instruction is directly sent by the mobile device to the UAV, without a need of transmitting the control instruction to the remote controller.

Step 140: Send the control instruction to the UAV, so that the UAV executes a corresponding flight mission according to the control instruction.

The control instruction is sent to the UAV, so that the UAV adjusts its course, attitude angle, speed or the like according to the control instruction, to execute the corresponding flight mission.

For example, when the voice instruction issued by the user is "Flight direction: southeast; flight distance: 3 meters", the remote control device generates the control instruction according to the current flight parameter and the target flight information, where the control instruction is used to control the UAV to execute a flight mission based on "Flight direction: southeast; flight distance: 3 meters". When the voice instruction issued by the user is "Flight speed: 5 meters per second", the remote control device generates the control instruction according to the current flight parameter and the target flight information, where the control instruction is used to control the UAV to execute a flight mission based on "Flight speed: 5 meters per second".

In this embodiment, voice information is obtained; target flight information of a UAV is determined according to the voice information, and a control instruction is generated according to a current flight parameter and the target flight information of the UAV; and the UAV may execute a corresponding flight mission according to the control instruction, so that a control operation for the UAV is simplified, difficulty of operation is reduced for an operator, and convenience and flexibility of operating the UAV can be improved, thereby improving user experience.

Figure 3:
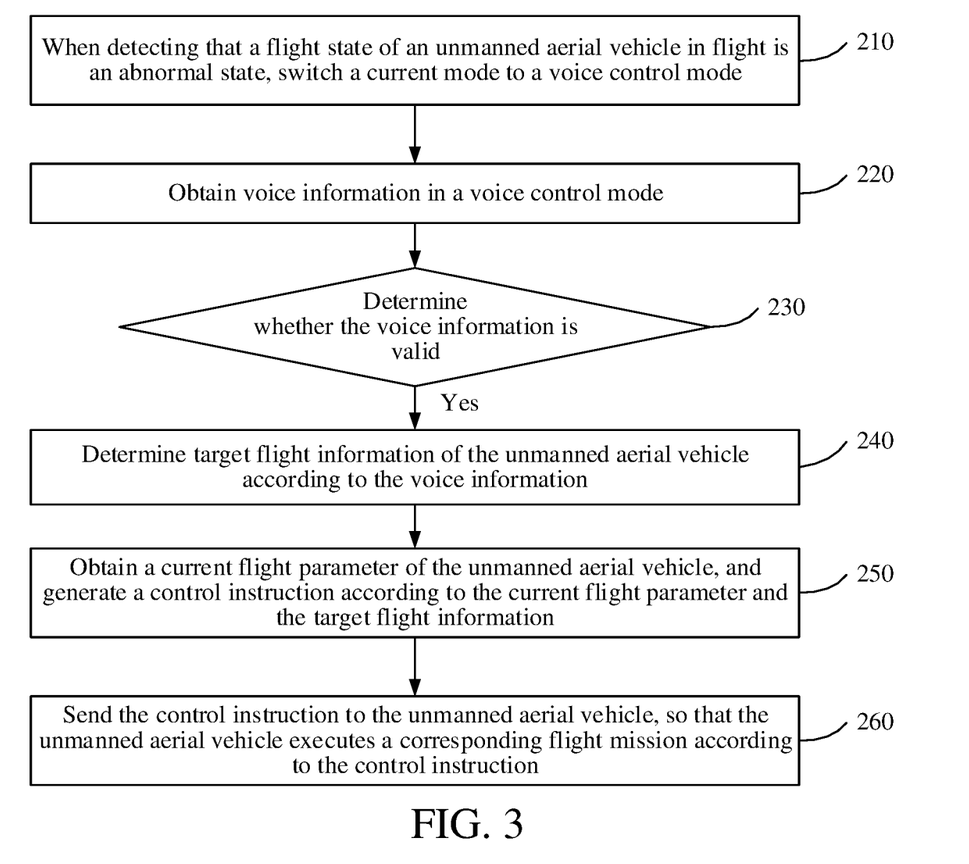
FIG. 3 is a schematic diagram of a UAV control method according to another embodiment of the present invention.

Referring to FIG. 3, FIG. 3 is a schematic diagram of a UAV control method according to another embodiment of the present invention. The method is applied to a remote control device, and specifically includes the following steps:

Step 210: When detecting that a flight state of a UAV in flight is an abnormal state, switch a current mode to a voice control mode.

Optionally, the abnormal state includes at least one of: a flight mode of the UAV being a posture mode, an electric quantity of the UAV being less than a preset electric quantity threshold, and the UAV stopping image transmission to the remote control device.

The UAV includes a global positioning system (GPS) mode and a posture mode. The GPS mode means that the UAV flies based on GPS data; and the posture mode means that the UAV flies without depending on GPS data, that is, a flight path of the UAV is random in the posture mode, the UAV provides only a posture stability augmentation function, and if the UAV is disturbed due to wind or another reason, spot hover cannot be implemented, and manual intervention is required. When the UAV receives no GPS signal or a compass is interfered, the posture mode is automatically entered.

An operation of an operator is highly required in the posture mode. When the flight mode of the UAV is the posture mode, the remote control device switches the current mode to the voice control mode, and a user may issue a voice instruction to control flight of the UAV, so that more accurate and safer flight is implemented.

When the electric quantity of the UAV is less than the preset electric quantity threshold, the remote control device switches the current mode to the voice control mode, and a user may issue a voice instruction to control flight of the UAV. More accurate flight of the UAV is implemented through voice control, power consumption of the UAV can be reduced, and it is ensured that the UAV can land safely.

When the UAV stops image transmission to the remote control device, the remote control device cannot display a real-time picture of a current position of the UAV. In this case, a user cannot know the current position and a head direction of the UAV, there is a risk of controlling flight of the UAV through a joystick or a key. The remote control device switches the current mode to the voice control mode, and the user may issue a voice instruction to control flight of the UAV, so that more accurate and safer flight is implemented.

Step 220: Obtain voice information in a voice control mode.

Step 230: Determine whether the voice information is valid.

Determining whether the voice information is valid is determining whether the voice information is valid voice control information.

Figure 4:
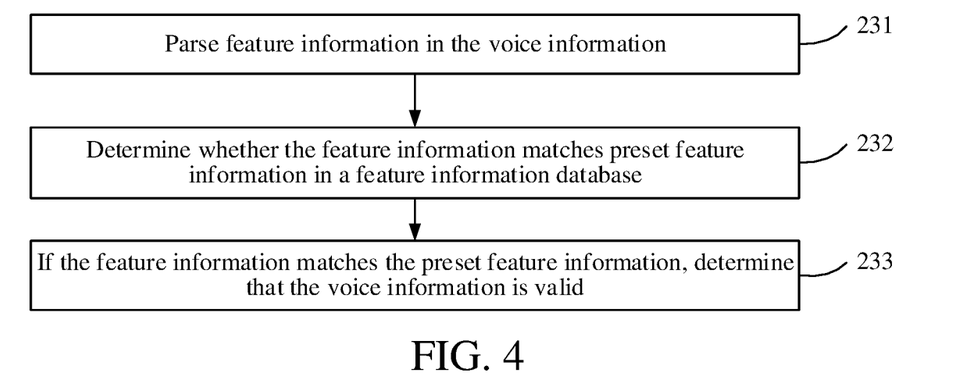
FIG. 4 is a schematic diagram of determining whether voice information is valid according to an embodiment of the present invention.

Optionally, as shown in FIG. 4, the determining whether the voice information is valid includes:

Step 231: Parse feature information in the voice information.

In an implementation, the voice information may be first converted into text information, and a keyword is extracted from the text information. The keyword is the feature information in the voice information. In this embodiment, the feature information includes action feature information and/or parameter feature information. The action feature information may be a word indicating an action, such as accelerating, ascending, fly-by, fly, or course reversal. The parameter feature information may be a specific value, a flight mode, a target, and a combination of any or more of a physical term, a geographical term, a unit, and a direction related to flight of the UAV and a specific value, for example, 3, a speed of 3, 3 meters per second, a longitude of 110, right above, and the posture mode.

Step 232: Determine whether the feature information matches preset feature information in a feature information database.

Correspondingly, the preset feature information in the feature information database includes preset action feature information and preset parameter feature information.

If the voice information includes the action feature information, it may be determined whether the action feature information exists in the preset action feature information in the feature information database; and if the action feature information exists in the preset action feature information, the feature information matches the preset feature information; otherwise, the feature information does not match the preset feature information.

If the voice information includes the parameter feature information, it may be determined whether the parameter feature information exists in the preset parameter feature information in the feature information database; and if the parameter feature information exists in the preset parameter feature information, the feature information matches the preset feature information; otherwise, the feature information does not match the preset feature information.

In another implementation, the parsing feature information in the voice information may include:

parsing one or more audio clips in the voice information.

For example, one or more audio clips may be parsed out from the voice information at a preset frequency. The preset frequency may be a sound frequency of the user or the like. This is not limited herein. The one or more audio clips that are parsed out are the feature information in the voice information.

Further, the feature information database may include a table of correspondences between audio clips and semantics. One or more keywords respectively corresponding to the one or more audio clips may be found through the table of correspondences. The one or more keywords may be used to indicate an action or a parameter. For example, the keyword may include a word used to indicate an action, for example, accelerating, ascending, fly-by, fly-away, or course reversal, or may include a word used to indicate a parameter, for example, a speed, a direction, a mode, or a position.

If a keyword corresponding to an audio clip in the voice information can be found from the feature information database, it indicates that the feature information matches the preset feature information; otherwise, it indicates that the feature information does not match the preset feature information.

Step 233: If the feature information matches the preset feature information, determine that the voice information is valid.

That the feature information matches the preset feature information in the feature information database includes: the action feature information matches the preset action feature information, and/or the parameter feature information matches the preset parameter feature information.

If the feature information matches the preset feature information, it is determined that the voice information is valid; or if the feature information does not match the preset feature information, prompt information indicating an incorrect voice instruction is output.

For example, the feature information in the voice information is "course reversal", and the feature information is the action feature information and matches "course reversal" in the preset action feature information, so that it may be determined that the voice information is valid. For another example, the feature information in the voice information is "speed: 3 meters per second", and the feature information is the parameter feature information and matches a speed measured in meters per second in the parameter feature information, so that it may be determined that the voice information is valid. For another example, the feature information in the voice information is "up 5", the feature information includes the action feature information "up" and the parameter feature information "5", and the action feature information matches "up" in the preset action feature information, so that it may be determined that the voice information is valid.

In some embodiments, the determining whether the voice information is valid further includes: identifying the voice information; and if the identification succeeds, determining that the voice information is valid.

For example, feature extraction and feature identification may be performed on the voice information. For another example, password identification may be performed on the voice information. Through the foregoing manner, voice control on the UAV can be limited to only an operator or an allowed user, and other surrounding human voices is prevented from affecting control on the UAV in an operation process.

Step 240: Determine target flight information of the UAV according to the voice information.

In some embodiments, if the voice information includes the action feature information, the determining target flight information of the UAV according to the voice information includes:

determining the target flight information of the UAV according to the action feature information.

The action feature information matches the preset action feature information in the feature information database. The preset action feature information includes a specific value corresponding to the preset action feature information. The specific value may be default in a system, or may be user-defined.

For example, the action feature information is "ascending", and it is determined, according to the preset action feature information matching the action feature information, that a target flight direction of the UAV is an upward direction and a target flight distance is 1 meter. For another example, the action feature information is "course reversal", and it is determined, according to the preset action feature information matching the action feature information, that a target flight position of the UAV is a start position and a target flight height is 0 meters. For another example, the action feature information is "accelerating", and it is determined, according to the preset action feature information matching the action feature information, that target flight acceleration of the UAV is 0.1 meter per second.

In some embodiments, if the voice information includes the parameter feature information, the determining target flight information of the UAV according to the voice information includes:

determining the target flight information of the UAV according to the parameter feature information.

For example, the parameter feature information is "height: 15 meters", and it is determined, according to the parameter feature information, that a target flight height of the UAV is 15 meters. For another example, the parameter feature information is "longitude: 114°, and latitude: 23°", and it is determined, according to the parameter feature information, that a target flight position of the UAV is a longitude of 114 and a latitude of 23°. For another example, the parameter feature information is the "posture mode", and it is determined, according to the parameter feature information, that a target flight mode of the UAV is the posture mode.

In some embodiments, the feature information in the voice information includes the action feature information and the parameter feature information, the determining target flight information of the UAV according to the voice information includes:

determining the target flight information of the UAV according to the action feature information and the parameter feature information.

For example, the feature information includes "to the left: 5", and it is determined, according to the feature information, that a target flight direction of the UAV is a left direction and a target flight distance is 5 meters. For another example, the feature information includes "fly", "me", and "right above", and it is determined, according to the feature information, that a target flight position of the UAV is "my" position and a target flight height is a current height.

Step 250: Obtain a current flight parameter of the UAV, and generate a control instruction according to the current flight parameter and the target flight information.

It should be noted that, there are two cases for the posture mode: there is a GPS signal and there is no GPS signal. When there is a GPS signal, the remote control device may plan a path according to a current position and the target flight position of the UAV, and output a control instruction. When there is no GPS signal, the remote control device cannot obtain a real-time position of the UAV, and the user can issue only a specific voice instruction to control flight of the UAV.

For example, when there is a GPS signal, the user may issue a voice instruction similar to "course reversal" or "fly right above me", and a target flight position of the UAV may be determined according to the voice information. The remote control device may plan a path according to a current position and the target flight position of the UAV, to generate a control instruction, so that the UAV executes a corresponding flight mission. When there is no GPS signal, the remote control device cannot obtain a real-time position of the UAV, and the user can issue a specific voice instruction similar to "upwards", "to the right", or "accelerating", to control flight of the UAV.

Therefore, when the UAV is in the posture mode without a GPS signal, when the remote control device cannot generate a control instruction according to the current flight parameter and the target flight information, the remote control device may output prompt information indicating an incorrect voice instruction, to prompt the user to re-issue a voice instruction.

Step 260: Send the control instruction to the UAV, so that the UAV executes a corresponding flight mission according to the control instruction.

In this embodiment, when it is detected that a flight state of a UAV in flight is an abnormal state, a current mode is switched to a voice control mode; feature information in voice information is parsed; and target flight information of the UAV is determined according to the action feature information and/or parameter feature information in the feature information, so that convenience and flexibility of operating the UAV can be further improved, and more accurate and safer flight is implemented.

Figure 6:
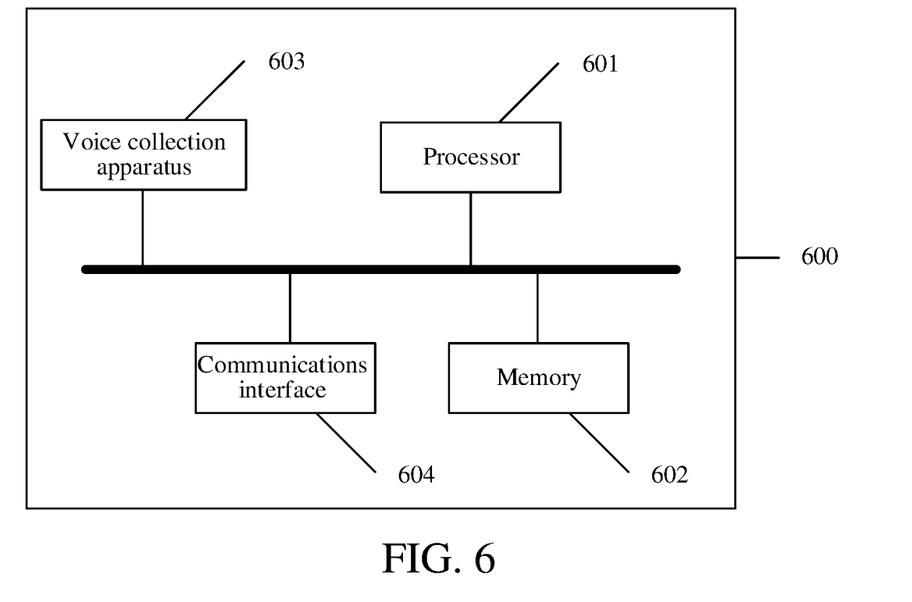
FIG. 6 is a schematic structural diagram of a remote control device according to an embodiment of the present invention.

An embodiment of the present invention further discloses a UAV control apparatus. The method is applied to a remote control device. Referring to FIG. 6, the apparatus 500 includes:

a voice information obtaining module 510, configured to obtain voice information;

a flight information determining module 520, configured to determine target flight information of a UAV according to the voice information;

a control instruction generation module 530, configured to obtain a current flight parameter of the UAV, and generate a control instruction according to the current flight parameter and the target flight information; and a control instruction sending module 540, configured to send the control instruction to the UAV, so that the UAV executes a corresponding flight mission according to the control instruction.

Optionally, the target flight information includes at least one piece of information of a target flight position, a target flight height, a target flight direction, a target flight distance, a target flight speed, target flight acceleration, and a target flight mode.

In this embodiment, the voice information obtaining module 510 obtains voice information; the flight information determining module 520 determines target flight information of a UAV according to the voice information, and generates a control instruction according to a current flight parameter and the target flight information of the UAV; and the UAV may execute a corresponding flight mission according to the control instruction, so that a control operation for the UAV is simplified, difficulty of operation is reduced for an operator, and convenience and flexibility of operating the UAV can be improved, thereby improving user experience.

In some embodiments, the apparatus 500 further includes:

a voice information judging module 550, configured to determine whether the voice information is valid; and the flight information determining module 520 is specifically configured to:

if the voice information is valid, determine the target flight information of the UAV according to the voice information.

Optionally, the voice information judging module 550 is specifically configured to:

parse feature information in the voice information;

determine whether the feature information matches preset feature information in a feature information database; and if the feature information matches the preset feature information, determine that the voice information is valid.

Optionally, the feature information includes action feature information and/or parameter feature information; and the flight information determining module 520 is specifically configured to:

determine the target flight information of the UAV according to the action feature information and/or the parameter feature information in the feature information.

In some embodiments, the apparatus 500 further includes:

a mode switching module 560, configured to: when detecting that a flight state of the UAV in flight is an abnormal state, switch a current mode to a voice control mode, where the abnormal state includes at least one of: a flight mode of the UAV being a posture mode, an electric quantity of the UAV being less than a preset electric quantity threshold, and the UAV stopping image transmission to the remote control device; and the voice information obtaining module 510 is specifically configured to:

obtain the voice information in the voice control mode.

In this embodiment, when detecting that a flight state of the UAV in flight is an abnormal state, the mode switching module 560 switches a current mode to a voice control mode; the voice information judging module 550 parses feature information in the voice information; and the flight information determining module 520 determines the target flight information of the UAV according to action feature information and/or parameter feature information in the feature information, so that convenience and flexibility of operating the UAV can be further improved, and more accurate and safer flight is implemented.

It should be noted that, because the apparatus embodiment and the method embodiment in the embodiments of the present invention are based on a same inventive concept, the technical content in the method embodiment is also applicable to the apparatus embodiment. Therefore, the same technical content in the apparatus embodiment and the method embodiment is not described in detail herein again.

An embodiment of the present invention further provides a remote control device. The remote control device stores a computer program such as an application program. The remote control device may perform the UAV control method in any of the foregoing method embodiments through the application program.

FIG. 6 is a schematic structural diagram of a remote control device 600 according to an embodiment of the present invention. As shown in FIG. 6, the remote control device 600 includes one or more processors 601 and a memory 602. One processor 601 is used as an example in FIG. 6.

The processor 601 may be connected to the memory 602 through a bus or another manner. A connection through the bus is used as an example in FIG. 6.

The remote control device 600 further includes a voice collection apparatus 603, configured to collect voice information of a user. Further, the voice collection apparatus 603 may be further configured to process the voice information.

A communications interface 604 is configured to communicate with a UAV, for example, send a control instruction to the UAV through control by the processor 601, or receive a current flight parameter sent by the UAV, and send the current flight parameter to the processor 601.

Figure 5:
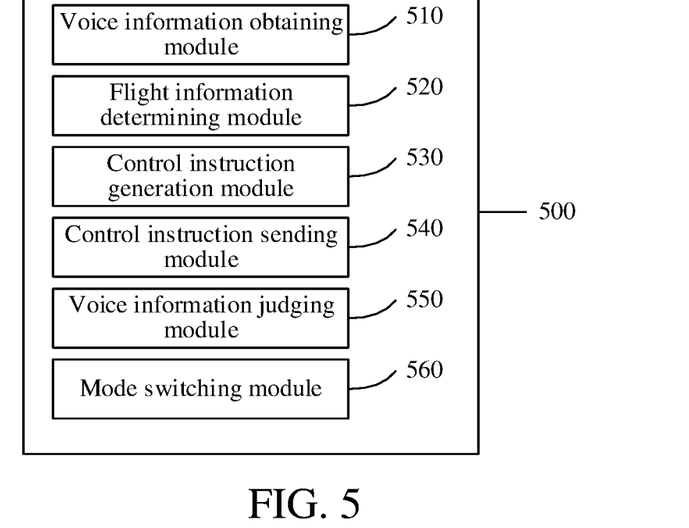
FIG. 5 is a schematic diagram of a UAV control apparatus according to an embodiment of the present invention.

The memory 602, as a non-volatile computer-readable storage medium, may be configured to store a non-volatile software program and a non-volatile computer executable program and module, for example, a program instruction/module (for example, the modules shown in FIG. 5) corresponding to the UAV control method in the embodiments of the present invention. The processor 601 runs the non-volatile software program, instruction, and module stored in the memory 602, to perform various functional applications and data processing of the UAV control apparatus, that is, implement the UAV control method in the foregoing method embodiments and functions of the modules in the foregoing apparatus embodiments.

The memory 602 may include a high-speed random access memory (RAM), and may further include a non-volatile memory such as at least one magnetic disk storage device or a flash memory device, or another volatile solid storage device. In some embodiments, the memory 602 optionally includes memories remotely disposed relative to the processor 601, and these remote memories may be connected to the processor 601 through a network. Examples of the network include, but are not limited to, the Internet, an intranet, a local area network, a mobile communications network, and a combination thereof.

The program instruction/module is stored in the memory 602. When the program instruction/module is executed by the one or more processors 601, the UAV control method in any of the foregoing method embodiments is performed, for example, the steps shown in FIG. 2 to FIG. 4 described above are performed; and the modules shown in FIG. 5 may also be implemented.

In this embodiment, the remote control device obtains voice information, determines target flight information of a UAV according to the voice information, and generates a control instruction according to a current flight parameter and the target flight information of the UAV; and the UAV may execute a corresponding flight mission according to the control instruction, so that a control operation for the UAV is simplified, difficulty of operation is reduced for an operator, and convenience and flexibility of operating the UAV can be improved, thereby improving user experience.

An embodiment of the present invention further provides a non-volatile computer storage medium. The computer storage medium stores a computer program, and the computer program is executed by one or more processors in a remote control device, for example, one processor 601 in FIG. 6, so that the one or more processors may perform the UAV control method in any of the foregoing method embodiments, for example, perform the steps shown in FIG. 2 to FIG. 4 described above; and may also implement the functions of the modules shown in FIG. 5.

The product may perform the method provided in the embodiments of the present invention, and have corresponding functional modules and beneficial effects for performing the method. For technical details that are not described in this embodiment, refer to the method provided in the embodiments of the present invention.

An embodiment of the present invention further provides a UAV system, including a UAV and a remote control device. For a structure of the remote control device, refer to the description in the foregoing apparatus embodiment; and for a method performed by the remote control device, refer to the description in the foregoing method embodiment. Details are not described herein again.

The UAV in the system may receive a control instruction from the remote control device, and flies according to the control instruction. Alternatively, the UAV may send a flight parameter of the UAV to the remote control device in response to the control instruction, and so on.

The apparatus embodiment described above is merely an example. The units described as separate parts may or may not be physically separate, and parts displayed as units may or may not be physical units, may be located in one position, or may be distributed on a plurality of network units. Some or all modules thereof may be selected based on an actual requirement, to achieve an objective of the solution in the embodiments.

Through the foregoing descriptions of the embodiments, persons skilled in the art may clearly understand that the embodiments may be implemented by software in addition to a universal hardware platform or certainly by hardware. Based on such an understanding, the technical solutions essentially or the part contributing to the related technology may be implemented in a form of a software product. The computer software product may be stored in a computer-readable storage medium, such as a read-only memory (ROM)/RAM, a magnetic disk, or an optical disc, and includes several instructions for instructing a computer device (which may be a personal computer, a server, a network device, or the like) to perform the methods described in the embodiments or some parts of the embodiments.

Finally, it should be noted that, the foregoing embodiments are merely intended for describing the technical solutions of the present invention rather than limiting the present invention. Under the concept of the present invention, the foregoing embodiments or the technical features in different embodiments may be combined, the steps may be implemented in any sequence, and there may be various other changes in different aspects of the present invention as described above. For brevity, they are not provided in detail. Although the present invention is described in detail with reference to the foregoing embodiments, persons of ordinary skill in the art should understand that they may still make modifications to the technical solutions recorded in the foregoing embodiments or make equivalent replacements to some of the technical features thereof, as long as these modifications or replaces do not cause the essence of corresponding technical solutions to depart from the scope of the technical solutions of the embodiments of the present application.

What is claimed is:

1. An unmanned aerial vehicle (UAV) control method, applied to a remote control device, the method comprising:
   obtaining voice information;
   determining target flight information of a UAV according to the voice information;
   obtaining a current flight parameter of the UAV, and generating a control instruction according to the current flight parameter and the target flight information; and
   sending the control instruction to the UAV, so that the UAV executes a corresponding flight mission according to the control instruction.

2. The method according to claim 1, wherein after the obtaining voice information, the method further comprises:
   determining whether the voice information is valid; and
   the determining target flight information of a UAV according to the voice information comprises:
   if the voice information is valid, determining the target flight information of the UAV according to the voice information.

3. The method according to claim 2, wherein the determining whether the voice information is valid comprises:
   parsing feature information in the voice information;
   determining whether the feature information matches preset feature information in a feature information database; and
   if the feature information matches the preset feature information, determining that the voice information is valid.

4. The method according to claim 3, wherein the feature information comprises action feature information and/or parameter feature information; and
   the determining target flight information of a UAV according to the voice information comprises:
   determining the target flight information of the UAV according to the action feature information and/or the parameter feature information in the feature information.

5. The method according to claim 1, wherein
   the target flight information comprises at least one piece of information of a target flight position, a target flight height, a target flight direction, a target flight distance, a target flight speed, target flight acceleration, and a target flight mode.

6. The method according to claim 1, wherein the method further comprises:
   when detecting that a flight state of the UAV in flight is an abnormal state, switching a current mode to a voice control mode, wherein
   the abnormal state comprises at least one of: a flight mode of the UAV being a posture mode, an electric quantity of the UAV being less than a preset electric quantity threshold, and the UAV stopping image transmission to the remote control device; and
   the obtaining voice information comprises:
   obtaining the voice information in the voice control mode.

7. A remote control device, comprising:
   at least one processor; and
   a memory connected to the at least one processor, wherein the memory stores a computer program, and the at least one processor is configured to invoke the computer program, to
   obtain voice information;
   determine target flight information of a UAV according to the voice information;
   obtain a current flight parameter of the UAV, and generating a control instruction according to the current flight parameter and the target flight information; and
   send the control instruction to the UAV, so that the UAV executes a corresponding flight mission according to the control instruction.

8. The remote control device according to claim 7, wherein the at least one processor is further configured to:
   determine whether the voice information is valid; and
   if the voice information is valid, determine the target flight information of the UAV according to the voice information.

9. The remote control device according to claim 8, wherein the at least one processor is further configured to:
   parse feature information in the voice information;
   determine whether the feature information matches preset feature information in a feature information database; and
   if the feature information matches the preset feature information, determine that the voice information is valid.

10. The remote control device according to claim 9, wherein the feature information comprises action feature information and/or parameter feature information; and
    wherein the at least one processor is further configured to:
    determine the target flight information of the UAV according to the action feature information and/or the parameter feature information in the feature information.

11. The remote control device according to claim 7, wherein
    the target flight information comprises at least one piece of information of a target flight position, a target flight height, a target flight direction, a target flight distance, a target flight speed, target flight acceleration, and a target flight mode.

12. The method according to claim 7, wherein the at least one processor is further configured to:
    when detecting that a flight state of the UAV in flight is an abnormal state, switch a current mode to a voice control mode, wherein
    the abnormal state comprises at least one of: a flight mode of the UAV being a posture mode, an electric quantity of the UAV being less than a preset electric quantity threshold, and the UAV stopping image transmission to the remote control device; and
    wherein the at least one processor is further configured to:
    obtain the voice information in the voice control mode.

13. An unmanned aerial vehicle (UAV) system, comprising a UAV and a remote control device, wherein
    the remote control device is configured to perform the method according to claim 1.

* * * * *